(12) United States Patent
Morgan

(10) Patent No.: US 10,244,743 B2
(45) Date of Patent: Apr. 2, 2019

(54) HOVERING FISHING LURE ASSEMBLY

(71) Applicant: Christopher James Morgan, Fayetteville, NC (US)

(72) Inventor: Christopher James Morgan, Fayetteville, NC (US)

( * ) Notice: Subject to any disclaimer, the term of this patent is extended or adjusted under 35 U.S.C. 154(b) by 354 days.

(21) Appl. No.: 14/850,350

(22) Filed: Sep. 10, 2015

(65) Prior Publication Data
US 2015/0373959 A1 Dec. 31, 2015

Related U.S. Application Data

(63) Continuation-in-part of application No. 13/871,112, filed on Apr. 26, 2013, now abandoned.

(51) Int. Cl.
*A01K 93/00* (2006.01)
*A01K 85/08* (2006.01)
*A01K 91/06* (2006.01)

(52) U.S. Cl.
CPC .............. *A01K 85/08* (2013.01); *A01K 91/06* (2013.01); *A01K 93/00* (2013.01)

(58) Field of Classification Search
CPC ........ A01K 91/06; A01K 93/00; A01K 91/08; A01K 95/00
See application file for complete search history.

(56) References Cited

U.S. PATENT DOCUMENTS

| | | | |
|---|---|---|---|
| 2,753,650 A * | 7/1956 | Rentz | A01K 91/06 43/42.33 |
| 2,851,816 A | 9/1958 | Gehrig | |
| 3,142,930 A * | 8/1964 | Lambach | A01K 93/00 43/44.95 |
| 3,346,987 A | 10/1967 | Cornwell | |
| 3,364,614 A * | 1/1968 | Huebotter | A01K 91/06 43/43.15 |
| 3,372,508 A * | 3/1968 | Maglinger | A01K 83/06 43/43.15 |
| 3,401,483 A | 9/1968 | Bellah et al. | |
| 4,300,304 A * | 11/1981 | Maycock | A01K 93/00 43/17 |
| 4,845,884 A | 7/1989 | Pacitti | |
| 5,185,951 A * | 2/1993 | Hemmerle | A01K 91/08 43/43.13 |
| 6,955,005 B2 | 10/2005 | Storelli | |
| 7,861,456 B2 | 1/2011 | Stone et al. | |
| 2002/0069575 A1 | 6/2002 | Taunton | |
| 2003/0233783 A1 | 12/2003 | Storelli | |
| 2012/0030991 A1* | 2/2012 | Chatfield | A01K 85/00 43/42.39 |

OTHER PUBLICATIONS

Search Report and Written Opinion for Corresponding PCT Application No. 2014/035459.
"Keel." Merriam-Webster, https://www.merriam-webster.com/dictionary/keel. Accessed Sep. 29, 2017.

\* cited by examiner

*Primary Examiner* — Thanh Pham
(74) *Attorney, Agent, or Firm* — James G. Passé; Passé Intellectual Property, LLC

(57) ABSTRACT

The present invention is a fishing hook delivery device for attaching a fishing lure and allowing it to hover above the water such as a dragonfly or other insect would hover over a body of water. A flotation body with a steel or carbon fiber wire attached flexible enough for the wire to sway but not dip into the water from the weight of the lure.

6 Claims, 6 Drawing Sheets

HOVERING FISHING LURE ASSEMBLY

This application is a continuation-in-part of U.S. non-provisional application Ser. No. 13/871,112 filed on Apr. 26, 2013, and is incorporated herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to fishing lures. In particular, the present invention relates to an assembly for attaching a fishing lure in a manner so that it hovers over the water in a natural manner during use.

Description of Related Art

The use of a fishing lure attempts to present to a fish a lure that mimics in some manner a natural bait, such as a dragonfly. Known lures include artificial replicas of natural or natural appearing baits and also provide devices for attaching live bait for presentation to attract and capture a fish during the process of fishing. Since, in their natural habitat bait appear as waterborne, on top of water, and in the air over the water, and can appear as a flying, swimming, dormant, injured or the like bait, numerous devices and lures have been invented to adapt lures for use in fishing. One particularly difficult bait to replicate is the bait that hovers over the water, such as a dragonfly. The dragonfly can hover a few inches over the water and be stationary or move about as it flies. Replicating that movement to date has not been successful. Pitching lures during casting, such as fly fishing, keeps the lure in the air only for a few seconds and, while it mimics a fly, it doesn't come close to mimicking a hovering bait. One attempt at creating a hovering bait is the use of a counterweighted float, which is shown in U.S. Pat. No. 6,955,005, wherein a float is used to hold a lure which has the fishing line attached directly to the lure. In some embodiments, there is a short rigid stem described as long enough to hold the lure above any weeds. However, there is no description which indicates it is designed to allow the lure to act as if it is actually flying, nor at a height which would mimic flying, but rather, since the lure is attached to a rigid stem, the lure would move as the float moves, bobbing up and down with the movement of the water and float. While successful at getting a lure off the water, it is a total failure in its attempt to mimic a hovering insect. Accordingly, a lure assembly wherein the lure moves in a way closer to a realistic hovering insect would be a tremendous improvement in the art of presenting a fishing lure as a fish attractant.

BRIEF SUMMARY OF THE INVENTION

The present invention relates to a floating assembly for attaching a fishing lure, where the lure is presented when the assembly is floating in such a way that it appears to fly and hover independent of the float in a natural manner.

Accordingly, the present invention, in one embodiment, is a device for floating on a body of water and attaching a fishing lure such that the lure appears to be hovering above the surface of the body of water and independent of the device comprising:
  a) a floating body having a first end and a second end, a top surface, which floats above the surface of the body of water, and a bottom surface which floats at or below the surface of the body of water in use;
  b) an eyelet for attaching a fishing line directly to the floating body first end; and
  c) a wire which is positioned on the upper surface of the device and of a stiffness that, when a fishing lure is attached at an opposite end, the wire holds the lure above the water and flexes in response to movement of the floating body.

DETAILED DESCRIPTION OF THE INVENTION

Figure 1:
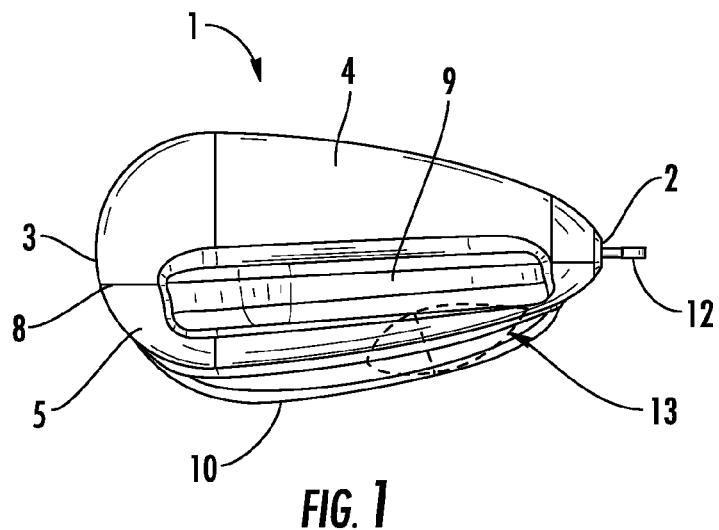
FIG. 1 is a side view of the body.

While this invention is susceptible to embodiment in many different forms, there is shown in the drawings, and will herein be described in detail, specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

References throughout this document to "one embodiment", "certain embodiments", and "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitations thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein the phrase "floating on a body of water" refers to a device which is capable of floating on a surface of a body of water for the purpose of catching fish. While the device will operate properly in any body of water, since the purpose of the device is to catch fish, slightly suspending the device over the surface of a body of water with catchable fish is intended. This can include a lake, river, ocean, sea or the like. It is assumed that in a body of water that the fish would be attracted to a fishing lure which hovers over the surface of the body of water.

As used herein, the phrase "hovering above the surface of the body of water" refers to an action which mimics an insect, such as a dragonfly, hovering just slightly above the water level, up to about 12 inches above the surface of the water. Hovering requires the insect lure to be able to move up, down, left and right relative to the device body. As used herein, the term "independent", as it refers to a hovering lure, refers to the ability to move left, right, up, and down while, as the body of the device moves about in the water, it does stay relatively close to the body. Therefore, it is not completely independent in the sense that it is not connected to the body, but it is independent only in that it has the ability to move up, down, left, and right relative to the device body.

As used herein, the phrase "fishing lure" refers to artificial or natural fishing bait (with hook, etc., designed for fishing) that would, if it were in a natural environment, hover over the surface of the water. Dragonflies and other insects are well known in the fishing industry and those and any other hovering insects could be utilized herein.

As used herein, the phrase "floating body" refers to a device which, when placed in a body of water, floats on the surface of the water with a top surface which floats above the surface of the water, and a bottom surface which floats at or below the surface of the water. The device will have an attached wire, as described later, and, as such, the body must be of a shape that can be pulled easily through the water, and be weighted, such that the wire and an attached lure will not tip the device over and place the lure in the water. In the examples in the figures, the body is about 3.75 inches in length and about 2.75 inches in width, including the wing stabilizers. It is clear that one could make the device half the size, double the size, or any size convenient. Such sizing is then within the skill in the art in view of the present invention disclosure.

The body can be made to float by making it of any convenient material and/or design. So for example, foams, such as expanded polystyrene foam, hollow bodies, wood and the like could be utilized. The selection of materials to make the body is within the skill in the art in view of this disclosure. Other materials could include cork or the like.

In one embodiment, the body is tapered from the front or first end to the back (an example is utilized in the Figures). In order to add stability to the body, help it glide through the water and the like, a keel can be added to the bottom of the body. In another embodiment, a pair of wing structures can be added at the left and right sides of the body as stabilizers, located roughly at the waterline when the device is in use.

As used herein an "eyelet" is a device known in the fishing trade for attaching a fishing line. The eyelet is placed at the floating body first end such that when a fishing line is attached, the floating body can be pulled through the water. Thus the device can be placed in the water or cast into the water and the fishing line used to retrieve it. Unlike other devices, the fishing line is not attached directly to the fishing lure. The fishing lure is attached to the semi-flexible wire of the present invention. In one embodiment, an eyelet is used to attach the wire in addition to the fishing line. In another embodiment, a spring loaded device (such as in FIG. 8) can be used to spring load both of the eyelets.

As used herein, a "wire" is a piece of wire having a stiffness that, when a fishing lure is attached to an opposite end of the wire and the first end attached to the body, the wire holds the lure above the water and flexes (bounces and swings) in response to the movement of the floating body and, in some embodiments, will respond to wind. The lure remains a relative distance from the body, but because the lure can swing left and right and bounce up and down, the lure can move at least semi-independent of the body of the device, giving the lure a natural movement. So the wire stiffness is a factor of three things: the length of the wire that sticks of out the body, the thickness (diameter) of the wire and the material the wire is made from. In general, steel, stainless steel or carbon fiber or the like will be used and wires will be stiff but have some bend from their own weight. The length of the wire that sticks out of the body will be from about 3 or 4 inches to about 11 to 18 inches. In one embodiment, it is about 12 inches long. In one embodiment, it is at least 5 inches, and in another the wire is at least 7 inches in length. In one embodiment, the wire is 0.025 inches in diameter, but in some instances it can be greater or smaller. The wire can, in one embodiment, be from about 0.0125 to about 0.050 inches. If the wire is too short it does not move, and if it is too thick it does not move. If the wire is too long it bends so much that the lure ends up in the water. One skilled in the art could start with a piece of stainless steel wire 0.025 inches in diameter and 12 inches long and observe the motion of that wire and determine what other combinations of length, thickness (diameter) and materials will behave similarly. The materials of the wire can be metals such as steel, stainless steel, carbon fiber, plastic or the like, as long as they meet the required stiffness and flexibility as taught above. The wire could have additional length for inserting into the body, for example, 1-5 inches of length.

The wire is attached to the body by any convenient method, such as an eyelet, so it can be inserted into the body and molded or glued into place. In one embodiment, it passes through the body and attaches to a back of the eyelet.

The position of the wire is on the upper surface (as shown in the Figures) which allows for it to be counterweighted in the front. Therefore positioning it somewhere in the back half of the body is in one embodiment, though any place where the device is balanced (with or without weights) is contemplated.

The selected fishing lure, such as a dragonfly lure shown in the Figures, is attached to the second free end of the wire away from the body of the device. It can be taped or clipped in place or held in place by any convenient method, but should be such that it can easily be replaced if the lure is lost, damaged or just a change is desired. A hook for catching fish could be attached to the wire or the lure.

In practice, the lure is attached to the wire as the lure body is pulled, jerked, or the like through the water. The lure bounces and swings on the wire, giving it a natural and, in the case of a fish, appetizing look to it.

Now, referring to the drawings: for further understanding of the present invention, FIG. 1 is a side view of a representative example of a body of the present invention device. In this view, body 1 has a first front end 2 and a second back end 3. As can be seen from the drawings, the body 1 tapers from the first end 2 to the second end 3, being larger at the second end. The body has a top side 4, and a bottom side 5, with a line 8 that represents about where the body 1 would float on the surface of a body of water. This embodiment of a body has left and right wings and a right wing 9 is shown right at waterline 8. A keel 10 is also shown. Both the keel 10 and the wings 9 help stabilize the body 1 in the water as it is pulled through the water by a fishing line 11 attached to eyelet 12. A cavity 13 for introducing a compensation weight is shown in dashed line as it is inside body 1. Selection of the weight is based on balancing the wire and lure to keep it from tipping over due to weight. This could be a fixed weight or a replaceable/changeable weight. Clearly, regular fishing weights or a weight as desired could be utilized.

Figure 2:
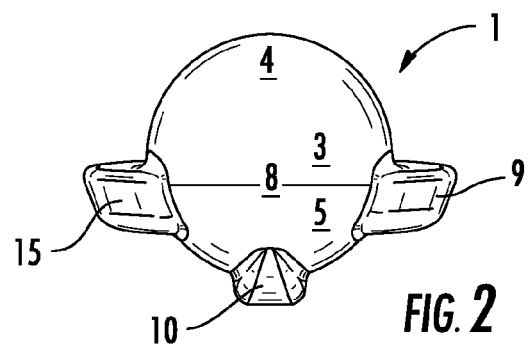
FIG. 2 is a back view of the body.

FIG. 2 is a rear view of body 1. In the view both right 9 and left 15 wings are shown.

Figure 3:
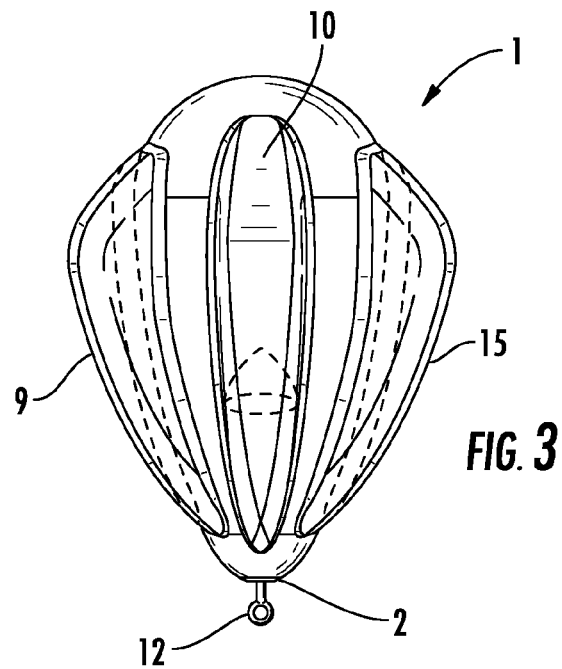
FIG. 3 is a bottom view of the body.

FIG. 3 is a bottom side view which allows the wings 9 and 15 and keel 10 to be fully seen in body 1.

Figure 4:
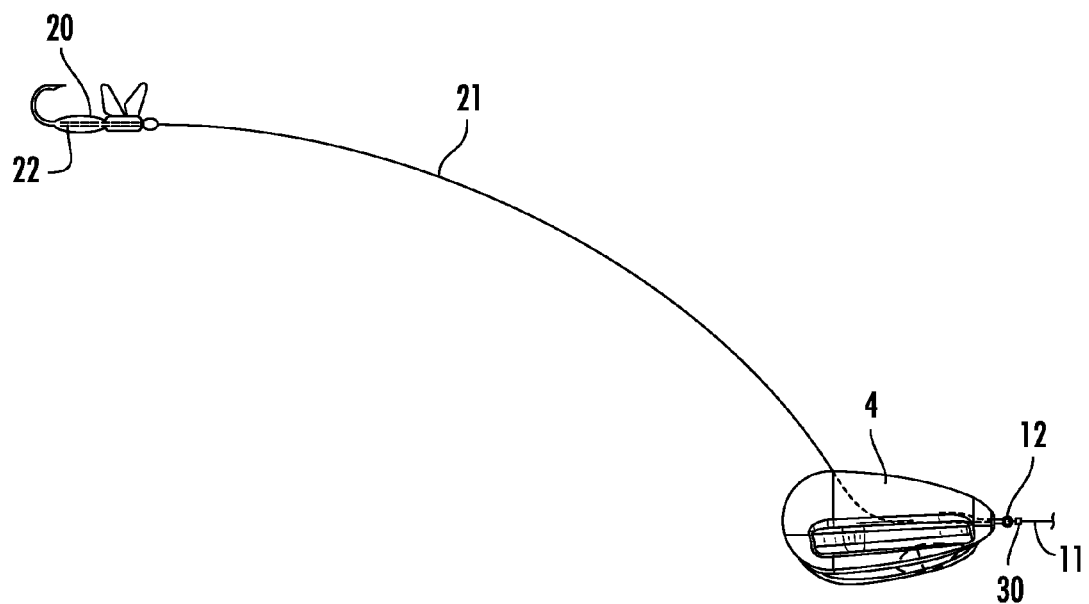
FIG. 4 is a side view of the device of the invention with a fishing lure attached and a cut out view of the inside of the body.

FIG. 4 is a side view of the present invention device with an attached dragonfly lure 20 attached to wire 21 at opposite wire end 22. The lure is attached using any desired method such as tape, sliding it on the wire and the like. In this view, a swivel 30 has been added where the fishing line 11 attaches and it can be seen that wire 21 enters the top 4 of the body 1 at the back half and attaches to eyelet 12 by passing all the way through body 1.

Figure 5:
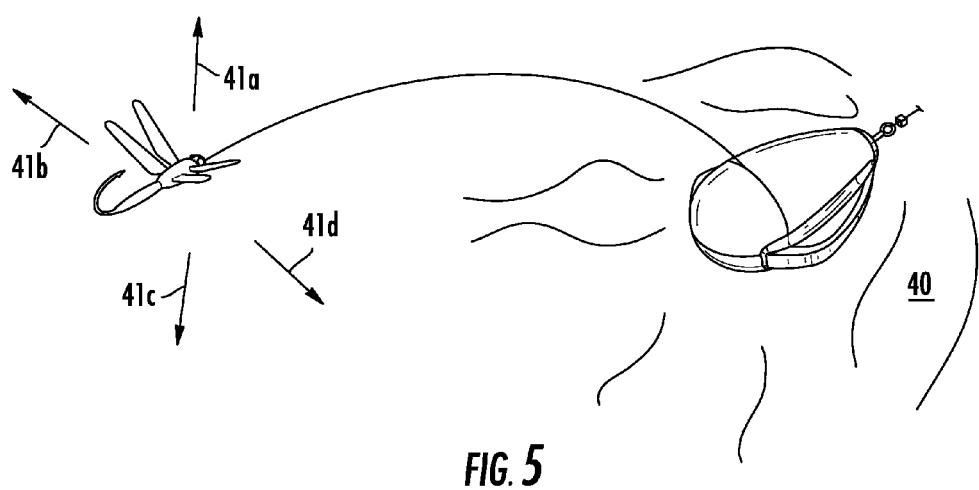
FIG. 5 is a perspective view of the device of the invention with a lure attached.

FIG. 5 is a perspective view of the device sitting on the surface of a body of water 40. Movement arrows 41a, 41b, 41c and 41d (4 degrees of motion) indicate the swing and bobbing motions which the lure 20 can have due to placement on the wire end.

Figure 6:
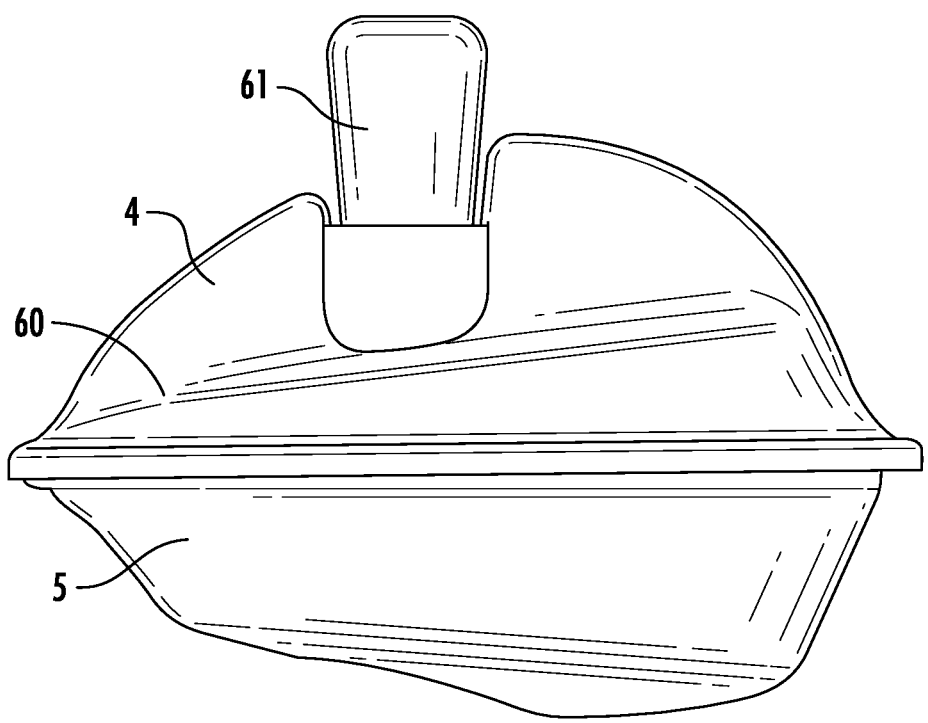
FIG. 6 is a side view of the device of the invention with a wire/fishing lure attachment device.
Figure 7:
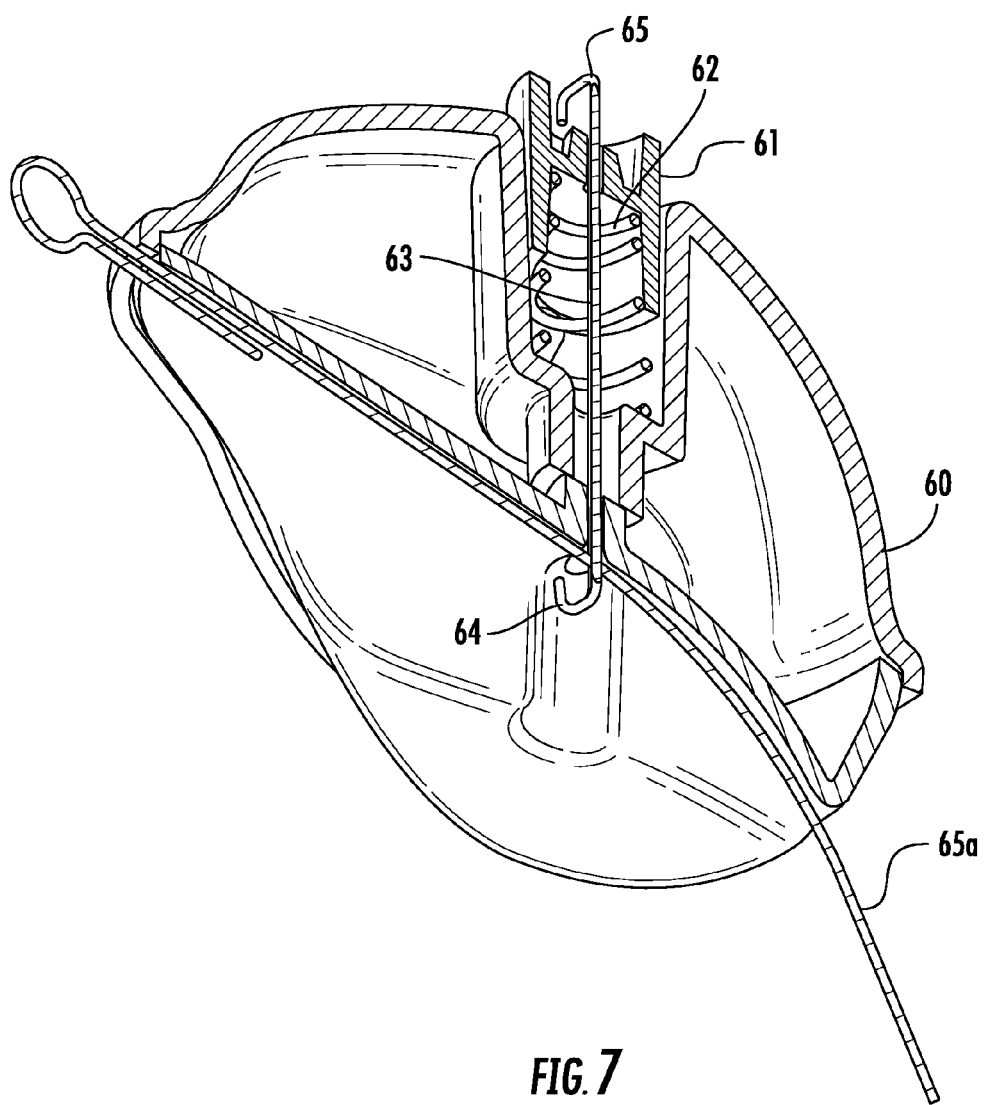
FIG. 7 is a cut away of the device of FIG. 6.
Figure 8:
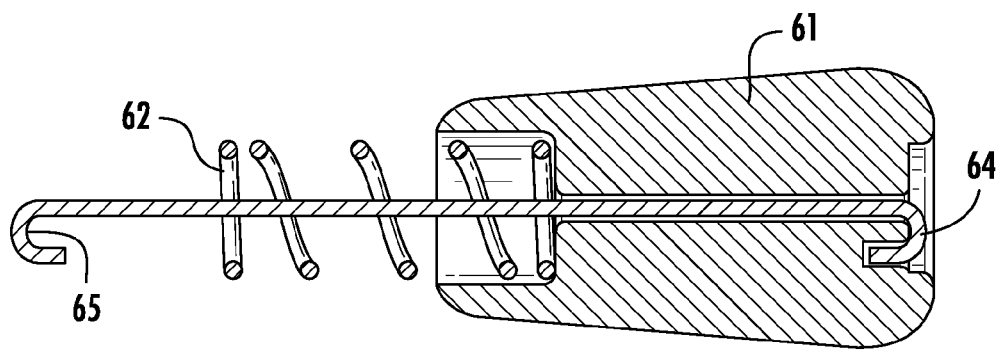
FIG. 8 is a through slice of the attachment means of FIG. 6.

FIGS. 6, 7, and 8 show an alternate embodiment of the device of the invention with a spring loaded device for attaching fishing line 11 to wire 21. FIG. 6 shows the side view of device 60 with spring loaded wire/fishing line attachment eyelet device 61. In FIG. 7 there is a partial cross-section of the device 60 with attachment device 61. In this view, spring 62 controls double eyelet wire 63 which opens first eyelet 64 for fishing line 65a and second eyelet 65 for wire 21. FIG. 8 is a cross section view of the attachment device 61.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects, only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the Applicant.

What is claimed is:

1. A rudderless device for floating on a body of water, pulling through the body of water by a fishing line, and having a fishing lure such that the lure appears to be flying above the surface of the body of water and moving independent of a movement of a rudderless floating body of the device consisting of:
   a) the rudderless floating body of the device having a front first end and a second back end, a top surface, which floats above the surface of the body of water, and a bottom surface, which floats at or below the surface of the body of water in use wherein the floating body comprises a longitudinal keel on the bottom surface of the body positioned to help it glide through the water, is weighted to prevent the body from tipping over due to the weight of the fishing lure, and the body is tapered from the front first end to the back rear end such that the second end is wider than the first end;
   b) a fishing line eyelet with the fishing line attached, the eyelet attached to the floating body front first end and fishing line pulling the device through the water; and
   c) a single wire which is positioned on the top surface of the device and is of a length wherein at least 7 inches and no more than about 18 inches sticks out of the body off the second back end, is held removably in place by a spring loaded eyelet, and has a lure only attached directly to one end of the wire, wherein the wire is of a stiffness that the wire holds the lure from just above the water to about 12 inches above the water and flexes in response to movement of the floating body such that the lure appears to be flying independent of the rudderless floating body without dipping the lure into the water while the device is being pulled by the fishing line; and
   d) a pair of wings on opposite sides of the body located at a waterline when the device is in use on the body of water.

2. The device according to claim 1 wherein there is a cavity in the body for placing weights.

3. The device according to claim 1 wherein the wire has a diameter from about 0.0125 inches to about 0.050 inches.

4. The device according to claim 1 wherein the body is at least partially made of polystyrene foam.

5. The device according to claim 1 wherein the wire is made of steel, stainless steel or carbon fiber.

6. The device according to claim 1 wherein the wire is a stainless steel wire having a length of about 12 inches that sticks out of the body and a diameter of about 0.025 inches.

* * * * *